(12) United States Patent
Sakamoto et al.

(10) Patent No.: US 12,197,006 B2
(45) Date of Patent: Jan. 14, 2025

(54) OPTICAL MULTIPLEXING CIRCUIT AND LIGHT SOURCE

(71) Applicant: Nippon Telegraph and Telephone Corporation, Tokyo (JP)

(72) Inventors: Junji Sakamoto, Musashino (JP); Toshikazu Hashimoto, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 282 days.

(21) Appl. No.: 17/614,676

(22) PCT Filed: May 30, 2019

(86) PCT No.: PCT/JP2019/021629
§ 371 (c)(1),
(2) Date: Nov. 29, 2021

(87) PCT Pub. No.: WO2020/240797
PCT Pub. Date: Dec. 3, 2020

(65) Prior Publication Data
US 2022/0229230 A1    Jul. 21, 2022

(51) Int. Cl.
*G02B 6/125* (2006.01)
*G02B 6/12* (2006.01)

(52) U.S. Cl.
CPC ......... *G02B 6/125* (2013.01); *G02B 6/12019* (2013.01)

(58) Field of Classification Search
None
See application file for complete search history.

(56) References Cited

U.S. PATENT DOCUMENTS 6,438,291 B1 * 8/2002 Duck ............... G02B 6/2804
385/27
2018/0128979 A1 * 5/2018 Heanue ............ G02B 6/12026

FOREIGN PATENT DOCUMENTS

| JP | 2015-35480 A | 2/2015 | |
| JP | 2018-180513 A | 11/2018 | |
| WO | WO-2019061897 A1 * | 4/2019 | ............... G02B 6/12 |

OTHER PUBLICATIONS

Translation of WO-2019061897-A1 (Year: 2019).*
Akira Nakao et al., *Integrated Waveguide-Type Red-Green-Blue Beam Combiners for Compact Projection-Type Displays*, Optics Communications, vol. 330, 2014, pp. 45-48.
(Continued)

*Primary Examiner* — Chad H Smith
(74) *Attorney, Agent, or Firm* — Workman Nydegger

(57) ABSTRACT

To provide an optical multiplexing circuit that can accurately monitor light of a plurality of wavelengths, and that can mitigate allowable errors in manufacturing. The present invention includes a plurality of branching units that each divide light output from a corresponding one of a plurality of input waveguides; a multiplexing unit that multiplexes beams each being one beam of the light divided by each of the plurality of branching units; an output waveguide that outputs the light multiplexed by the multiplexing unit; and a plurality of monitoring waveguides that each output another beam of the light divided by the plurality of branching units, wherein a plurality of optical multiplexing circuits including multiplexing units having different multiplexing characteristics are provided on a same substrate.

10 Claims, 9 Drawing Sheets

(56) References Cited

OTHER PUBLICATIONS

Yoshinori Hibino, *An Array of Photonic Filtering Advantages: Arrayed-Waveguide-Grating Multi / Demultiplexers for Photonic Networks*, IEEE Circuits and Devices, Nov. 2000, pp. 21-27.
Akira Himeno et al., *Silica-Based Planar Lightwave Circuits*, IEEE Journal of Selected Topics in Quantum Electronics, vol. 4, No. 6, 1998, pp. 913-924.
J. Sakamoto et al., *High-Efficiency Multiple-Light-Source Red-Green-Blue Power Combiner with Optical Waveguide Mode Coupling Technique*, SPIE OPTO, 2017, vol. 10126, 2017, pp. 1-8.

\* cited by examiner

OPTICAL MULTIPLEXING CIRCUIT AND LIGHT SOURCE

TECHNICAL FIELD

The present invention relates to an optical multiplexing circuit and a light source, and more particularly to an optical multiplexing circuit capable of multiplexing light of a plurality of wavelengths such as three primary colors of light and monitoring the intensity of light of each wavelength, and a light source including the optical multiplexing circuit.

BACKGROUND ART

In recent years, a small light source including laser diodes (LDs) that output light of three primary colors of red light (R), green light (G), and blue light (B) as a light source to be applied to a glasses-type terminal and a small pico projector has been developed. Since LDs have a higher directionality than LEDs, a focus-free projector can be realized. Further, since LDs have a high light emission efficiency and a low power consumption, and also a high color reproducibility, LDs have recently been attracting attention.

FIG. 1 illustrates a typical light source of a projector using LDs. The light source for the projector includes LDs 1 to 3 that output light of a single wavelength of respective colors of R, G, and B, lenses 4 to 6 that collimate the light output from the LDs 1 to 3, and dichroic mirrors 10 to 12 that multiplex the respective light and output the light to a MEMS mirror 16. RGB light combined into a single beam is swept by using the MEMS mirror 16 or the like and is synchronized with modulation of the LDs, and thus an image is projected onto a screen 17. Half mirrors 7 to 9 are respectively inserted between the lenses 4 to 6 and the dichroic mirrors 10 to 12, and white balance is adjusted by monitoring the divided light of each color by using photodiodes (PDs) 13 to 15.

In general, an LD emits light in a longitudinal direction of a resonator; however, because the accuracy when monitoring the rear side is poor, it is common to monitor the front side from which light is emitted (front monitoring). As illustrated in FIG. 1, for use as an RGB light source, bulk optical components such as the LDs 1 to 3, the lenses 4 to 6, the half mirrors 7 to 9, and the dichroic mirrors 10 to 12 need to be combined with a spatial optical system. Furthermore, for monitoring for an adjustment of white balance, since bulk components such as the half mirrors 7 to 9 and the PDs 13 to 15 are needed and the optical system increases in size, there is a problem in that a reduction in the size of the light source is hindered.

On the other hand, an RGB coupler using a planar lightwave circuit (PLC) instead of a spatial optical system with bulk components has been attracting attention (for example, see Non Patent Literature 1). In a PLC, an optical waveguide is produced on a planar substrate such as Si by patterning by photolithography or the like, and reactive ion etching, and a plurality of basic optical circuits (for example, a directional coupler, a Mach-Zehnder interferometer, and the like) are combined, and thus various functions can be realized (for example, see Non Patent Literatures 2 and 3).

FIG. 2 illustrates a basic structure of an RGB coupler using a PLC. An RGB coupler module including LDs 21 to 23 of respective colors of G, B, and R and a PLC-type RGB coupler 20 is illustrated. The RGB coupler 20 includes first to third waveguides 31 to 33 and first and second multiplexers 34 and 35 that multiplex light from two waveguides into a single waveguide. As methods using a multiplexer in an RGB coupler module, there are a method of using symmetrical directional couplers having the same waveguide width, a method of using a Mach-Zehnder interferometer (for example, see Non Patent Literature 1), and a method of using a mode coupler (for example, see Non Patent Literature 4), and the like.

By using a PLC, a spatial optical system using a lens, a dichroic mirror, or the like can be integrated on one chip. Further, since the LD of R and the LD of G have a weaker output than that of the LD of B, an RRGGB light source in which two LDs of R and two LDs of G are prepared is used. As described in Non Patent Literature 2, by using mode multiplexing, light of the same wavelength can be multiplexed in different modes, and an RRGGB coupler can also be easily realized by using a PLC.

CITATION LIST

Non Patent Literature

[Non Patent Literature 1] A. Nakao, R. Morimoto, Y. Kato, Y. Kakinoki, K. Ogawa and T. Katsuyama, "Integrated Waveguide-type Red-green-blue Beam Combiners for Compact Projection-type Displays", Optics Communications 320 (2014) 45-48

[Non Patent Literature 2] Y. Hibino, "Arrayed-Waveguide-Grating Multi/Demultiplexers for Photonic Networks," IEEE CIRCUITS & DEVICES, November, 2000, pp. 21-27

[Non Patent Literature 3] A. Himeno, et al., "Silica-based Planar Lightwave Circuits," J. Sel. Top. Q.E., vol. 4, 1998, pp. 913-924

[Non Patent Literature 4] J. Sakamoto et al. "High-efficiency Multiple-light-source Red-green-blue Power Combiner with Optical Waveguide Mode Coupling Technique," Proc. of SPIE Vol. 10126 101260 M-2

SUMMARY OF THE INVENTION

Technical Problem

FIG. 3 illustrates a configuration of an RGB coupler using two directional couplers. An RGB coupler 100 using the PLC includes first to third input waveguides 101 to 103, first and second directional couplers 104 and 105, and an output waveguide 106 connected to the second input waveguide 102.

A waveguide length, a waveguide width, and a gap between the waveguides are designed such that the first directional coupler 104 couples light of λ2 incident from the first input waveguide 101 to the second input waveguide 102, and couples light of λ1 incident from the second input waveguide 102 to the first input waveguide 101 and back to the second input waveguide 102. A waveguide length, a waveguide width, and a gap between the waveguides are designed such that the second directional coupler 105 couples light of λ3 incident from the third input waveguide 103 to the second input waveguide 102, and passes light of λ1 and λ2 coupled to the second input waveguide 102 in the first directional coupler 104.

For example, green light G (wavelength λ2) is incident on the first input waveguide 101, blue light B (wavelength λ1) is incident on the second input waveguide 102, red light R (wavelength λ3) is incident on the third input waveguide 103, and the three colors of light R, G, and B are multiplexed by the first and second directional couplers 104 and 105 and output from the output waveguide 106. Light of 450 nm, light of 520 nm, and light of 638 nm are used as the wavelengths of λ1, λ2, and λ3, respectively.

Thus, the application of such an RGB coupler to configure a light source including a monitoring function for an adjustment of white balance is demanded. Meanwhile, because the wavelength of the RGB coupler 100 using the PLC is shorter than the wavelength of the optical coupler in the communication wavelength bands, the allowable error in manufacturing is small. Thus, even with a light source with increased accuracy of monitoring, in a case where the error in manufacturing is large, it may be out of a range for feedback control when the light source is in actual operation. When the allowable error in manufacturing is set to be smaller, the yield becomes low, and there is a problem in that the manufacturing cost of the light source is increased.

Means for Solving the Problem

An object of the present invention is to provide an optical multiplexing circuit including a multiplexing unit constituted by a PLC, which can accurately monitor light of a plurality of wavelengths and can mitigate allowable errors in manufacturing, and a light source including the optical multiplexing circuit.

According to the present invention, in order to achieve such an object, an embodiment of an optical multiplexing circuit includes: a plurality of branching units each configured to divide light output from a corresponding one of a plurality of input waveguides; a multiplexing unit configured to multiplex beams each being one beam of the light divided by each of the plurality of branching units; an output waveguide configured to output the light multiplexed by the multiplexing unit; and a plurality of monitoring waveguides each configured to output another beam of the light divided by each of the plurality of branching units, wherein a plurality of optical multiplexing circuits including multiplexing units having different multiplexing characteristics are provided on a same substrate.

An embodiment of a light source with a monitoring function includes: the optical multiplexing circuit; a plurality of laser diodes each optically coupled to a corresponding one of the plurality of input waveguides; and a plurality of photodiodes each optically coupled to a corresponding one of the plurality of monitoring waveguides, wherein the multiplexing unit is switched by changing a fixed position of the optical multiplexing circuit relative to the plurality of laser diodes and the plurality of photodiodes.

Effects of the Invention

According to the present invention, it is possible to easily switch between multiplexing units with different characteristics, and thus even an optical multiplexing circuit having a small allowable error in manufacturing is capable of individual accurate monitoring even in a case of being subjected to actual operation without reducing the yield.

DESCRIPTION OF EMBODIMENTS

Hereinafter, embodiments of the present disclosure will be described in detail with reference to the drawings. In the present embodiment, description is given for the case of a method using a directional coupler as a multiplexer, but the present invention is not limited to a multiplexing method. An RGB coupler that multiplexes wavelengths of three primary colors of light is described as an example, but it goes without saying that the present invention can be applied to optical multiplexing circuits that multiplex a plurality of other wavelengths.

First Embodiment

Figure 4:
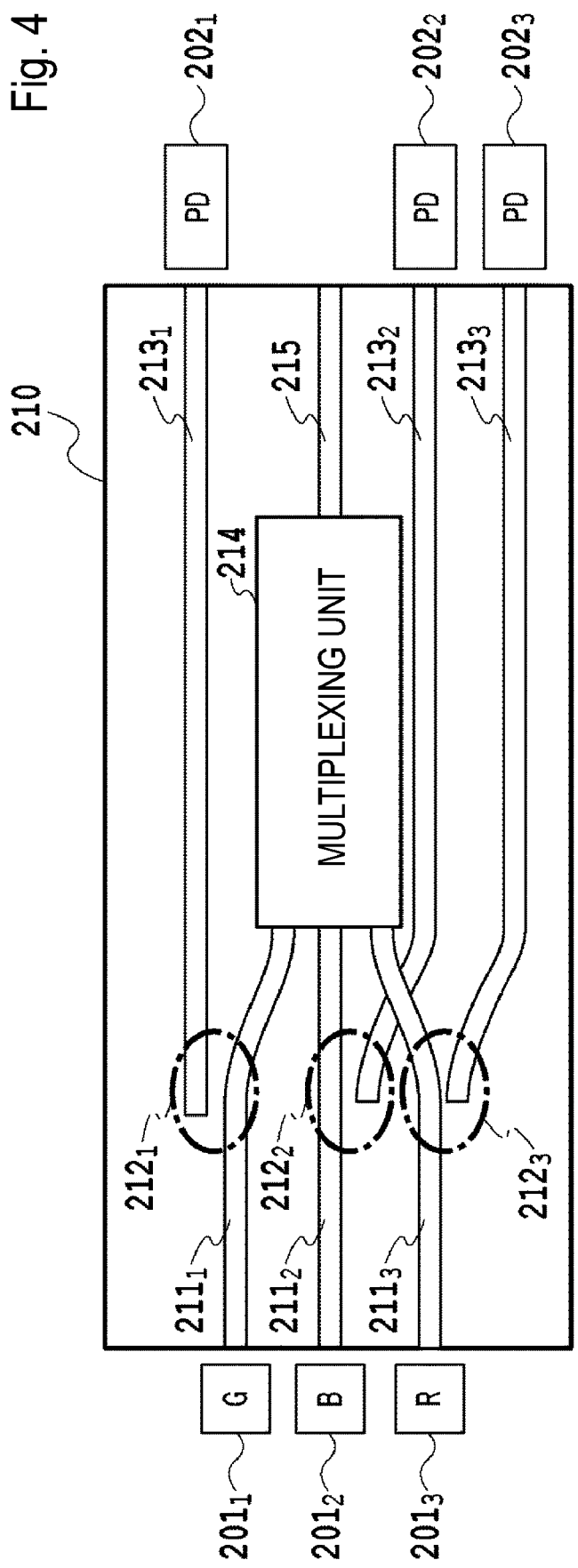
FIG. 4 is a diagram illustrating a light source with a monitoring function according to a first embodiment of the present invention.

FIG. 4 is a diagram illustrating a light source with a monitoring function according to a first example of a first embodiment of the present invention. A light source with a monitoring function includes first to third LDs $201_1$ to $201_3$ that respectively output light of respective colors of R, G, and B, a PLC-type RGB coupler 210, and first to third PDs $202_1$ to $202_3$ optically connected to the RGB coupler 210.

The PLC-type RGB coupler 210 includes first to third input waveguides $211_1$ to $211_3$ optically connected to the first to third LDs $201_1$ to $201_3$, first to third branching units $212_1$ to $212_3$ that divide light propagating through the waveguide into two, a multiplexing unit 214 that multiplexes one beam of the light divided by each of the first to third branching units $212_1$ to $212_3$, first to third monitoring waveguides $213_1$ to $213_3$ that output the other beam of the light divided by each of the first to third branching units $212_1$ to $212_3$ to the first to third PDs $202_1$ to $202_3$, and an output waveguide 215 that outputs the light multiplexed by the multiplexing unit 214.

In the PLC-type RGB coupler 210, light incident on each of the first to third input waveguides $211_1$ to $211_3$ is divided into two by each of the first to third branching units $212_1$ to $212_3$. One beam of the divided light is output to the first to third PDs $202_1$ to $202_3$ via the first to third monitoring waveguides $213_1$ to $213_3$, and the other beam of the divided light is multiplexed by the multiplexing unit 214 and output to the output waveguide 215.

Figure 1:
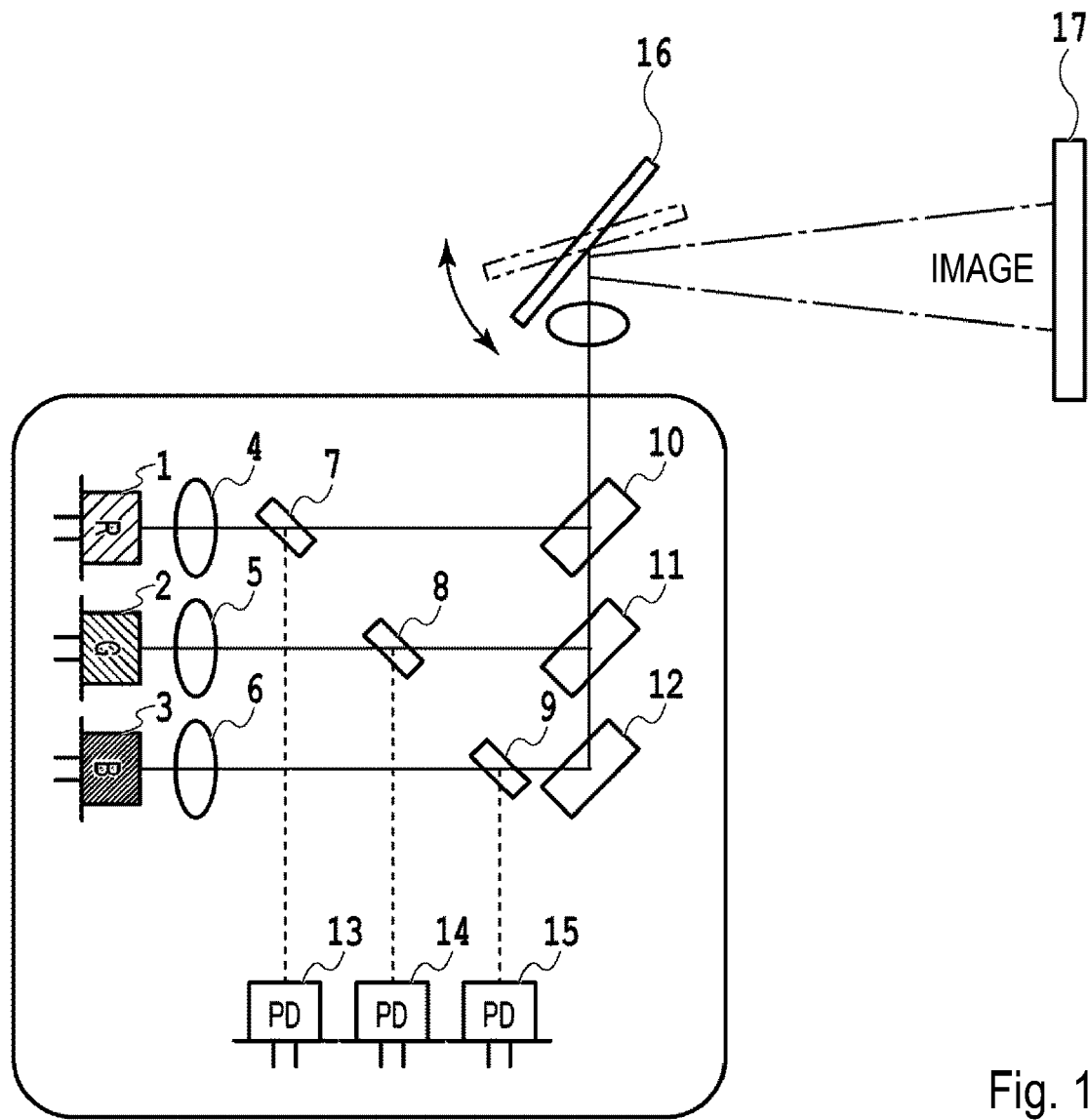
FIG. 1 is a diagram illustrating a typical light source of a projector using LDs.
Figure 2:
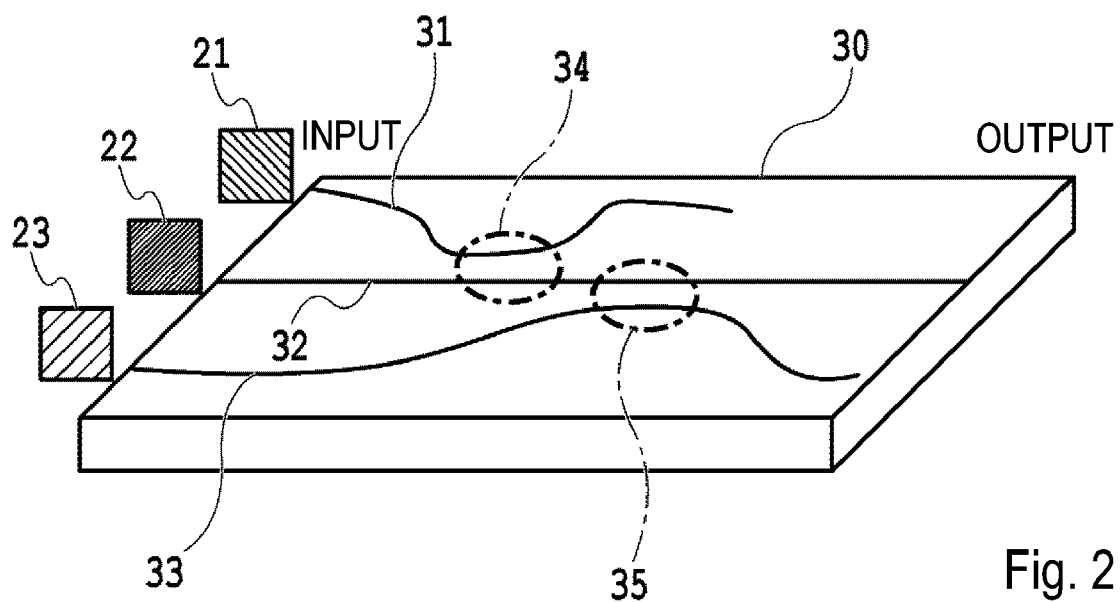
FIG. 2 is a diagram illustrating a basic structure of an RGB coupler using a PLC.
Figure 3:
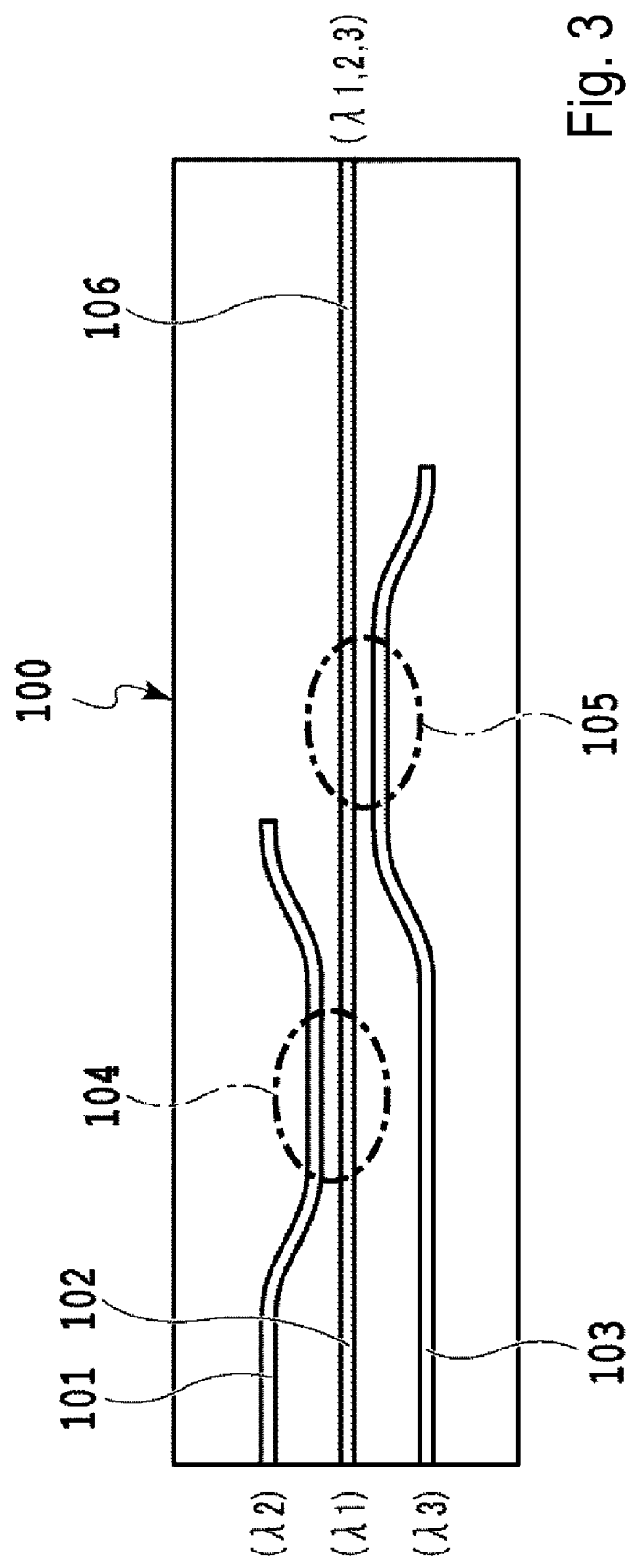
FIG. 3 is a diagram illustrating a configuration of an RGB coupler using two directional couplers.

An optical multiplexing circuit using the directional coupler illustrated in FIG. 3 can be used as the multiplexing unit 214. In this case, the first to third input waveguides $211_1$ to $211_3$ are coupled to the first to third input waveguides 101 to 103 illustrated in FIG. 3, respectively, and the output waveguide 215 is coupled to the output waveguide 106 illustrated in FIG. 3. However, the multiplexing unit 214 is not limited thereto, and another multiplexing unit of a waveguide type (for example, a Mach-Zehnder interferometer, a mode coupler, or the like) may be used.

As illustrated in FIG. 4, when light propagating through the first to third input waveguides $211_1$ to $211_3$ is divided by the first to third branching units $212_1$ to $212_3$, respectively, a coupling characteristic between the first to third LDs $201_1$ to $201_3$ and the first to third input waveguides $211_1$ to $211_3$ can be monitored. In addition, it is possible to adjust white balance as a light source by using a monitoring value of the first to third PDs $202_1$ to $202_3$ by recognizing a multiplexing characteristic of the multiplexing unit 214 in advance.

Second Embodiment

According to the first example of the first embodiment, the first to third PDs $202_1$ to $202_3$ can respectively monitor light of the respective colors of R, G, and B. Thus, even if, for example, deviation from a design value of an RGB coupler is different between the short wavelength side (B) and the long wavelength side (R) due to an error in manufacturing, a white balance can be adjusted with high accuracy since feedback control can be performed individually. However, in a case where it is out of a range for feedback control due to the error in manufacturing, accurate white balance adjustment cannot be made. Thus, in a second embodiment, a configuration is employed in which individual accurate monitoring is possible even at a time of actual operation of a light source without setting a small allowable error in manufacturing.

First Example

Figure 5:
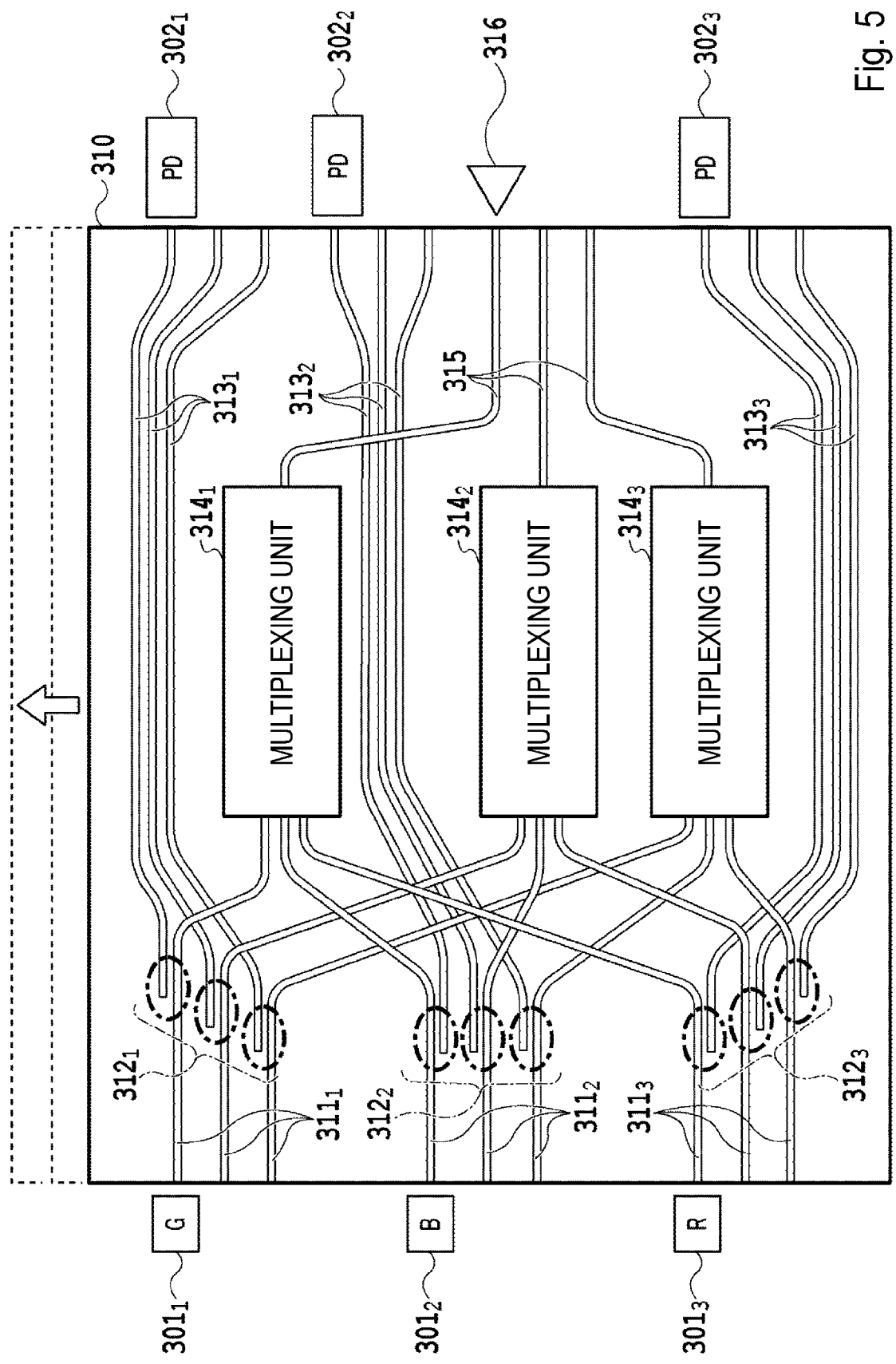
FIG. 5 is a diagram illustrating a light source with a monitoring function according to a first example of a second embodiment of the present invention.

FIG. 5 is a diagram illustrating a light source with a monitoring function according to a first example of the second embodiment of the present invention. The light source of the first example can be said to have a configuration in which three of the RGB coupler 210 of the first embodiment are integrated into an RGB coupler 310 on the same PLC substrate. A light source with a monitoring function includes first to third LDs $301_1$ to $301_3$ that respectively output light of respective colors R, G, and B, a PLC-type RGB coupler 310, and first to third PDs $302_1$ to $302_3$ optically connected to the RGB coupler 310.

The PLC-type RGB coupler 310 includes first to third input waveguides $311_1$ to $311_3$, first to third branching units $312_1$ to $312_3$, multiplexing units $314_1$ to $314_3$, first to third monitoring waveguides $313_1$ to $313_3$, and output waveguides 315. The first to third input waveguides $311_1$ to $311_3$ are optically connected to the first to third LDs $301_1$ to $301_3$. The first to third branching units $312_1$ to $312_3$ divide light propagating through the first to third input waveguides $311_1$ to $311_3$ into two. The multiplexing units $314_1$ to $314_3$ multiplex one beam of the light divided by the first to third branching units $312_1$ to $312_3$. The other beam of the light divided by the first to third branching units $312_1$ to $312_3$ propagates through the first to third monitoring waveguides $313_1$ to $313_3$ and is output to the first to third PDs $302_1$ to $302_3$. The light multiplexed by the multiplexing unit 214 propagates through the output waveguide 315 and is output to an output port 316.

The multiplexing units $314_1$ to $314_3$ may use, for example, an RGB coupler illustrated in FIG. 3, and are multiplexing units with the same circuit format. However, the multiplexing units are designed such that the wavelength at which the transmittance of the multiplexing units is greatest is shifted toward the long wavelength side at the multiplexing unit $314_3$ and shifted toward the short wavelength side at the multiplexing unit $314_1$ with respect to the multiplexing unit $314_2$. For example, for the waveguide length, the waveguide width, and the gap between the waveguides of the RGB coupler 310, the multiplexing unit $314_2$ in accordance with the design values and the multiplexing units $314_1$ and $314_3$ with the design values ±0.05 µm are fabricated on the same substrate.

In the state illustrated in FIG. 5, the first to third LDs $301_1$ to $301_3$ and the output port 316 are connected to the multiplexing unit $314_1$, and the first to third PDs $302_1$ to $302_3$ respectively monitor the outputs of the first to third LDs $301_1$ to $301_3$. In a case where it is out of a range for feedback control when the light source is in actual operation, as illustrated in FIG. 5, the fixed position of the RGB coupler 310 can be changed relative to the LDs and PDs, and can be switched from the multiplexing unit $314_1$ to the multiplexing unit $314_2$ or the multiplexing unit $314_3$.

With such a configuration, it is possible to easily switch between multiplexing units with different characteristics, and thus even an RGB coupler having a small allowable error in manufacturing is capable of individual accurate monitoring even in a case of being in actual operation without reducing the yield. Because optical circuits are fabricated on the same wafer or chip, there is no increase in manufacturing cost and no additional components are needed because it can be made simultaneously in a single process.

Second Example

Figure 6:
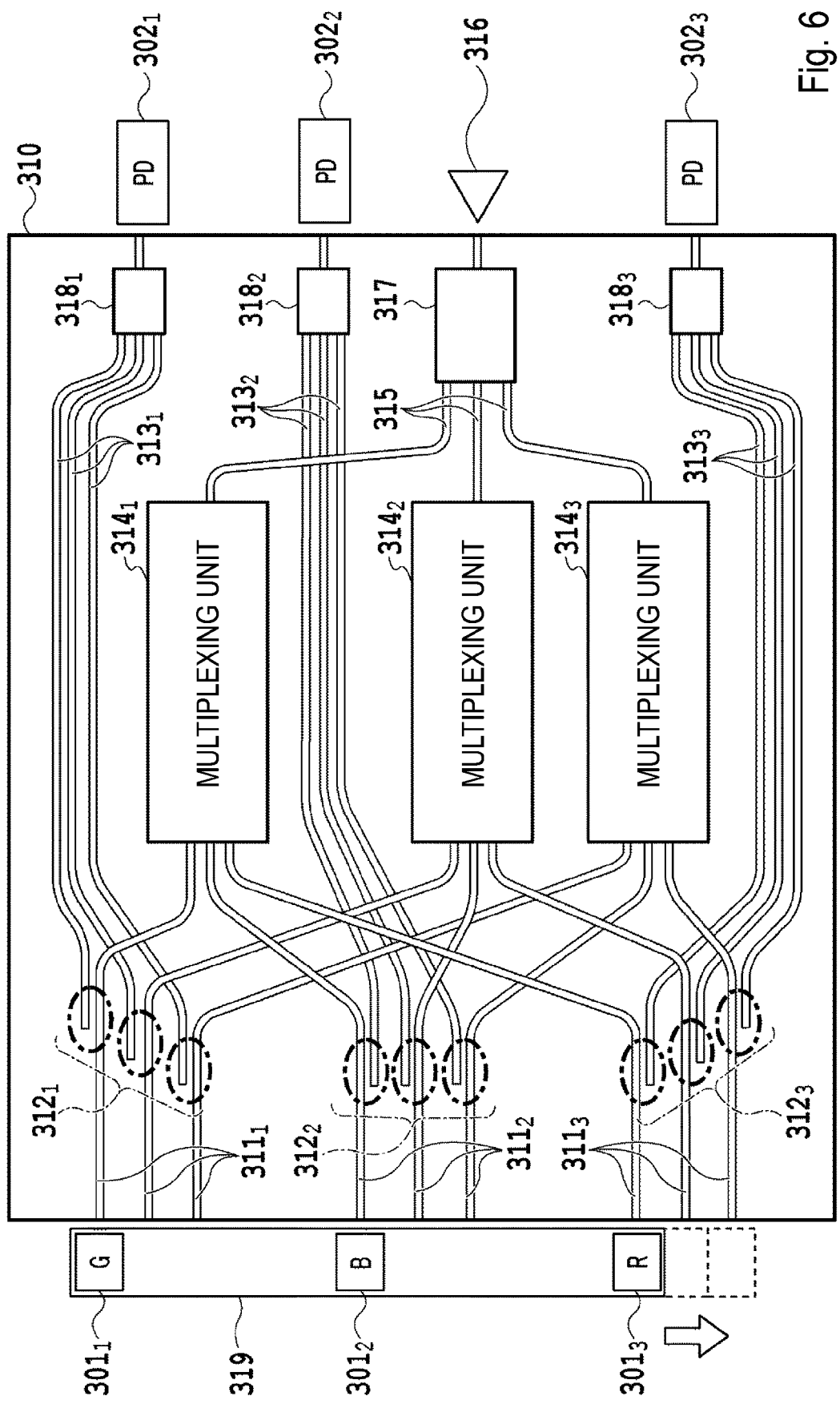
FIG. 6 is a diagram illustrating a light source with a monitoring function according to a second example of the second embodiment of the present invention.

FIG. 6 illustrates a light source with a monitoring function according to a second example of the second embodiment of the present invention. The configuration of the light source with a monitoring function is the same as that of the first example, except that the light source is different from that of the first example in that three outputs from the multiplexing units $314_1$ to $314_3$ are multiplexed by a multiplexer 317 and output to the output port 316, and three outputs of the respective first to third monitoring waveguides $313_1$ to $313_3$ are multiplexed by multiplexing units $318_1$ to $318_3$ and output to the first to third PDs $302_1$ to $302_3$. The first to third LDs $301_1$ to $301_3$ are fixed to an LD mount 319, and by changing the fixed position of the LD mount 319 relative to the RGB coupler 310, it is possible to switch from the multiplexing unit $314_1$ to the multiplexing unit $314_2$ or the multiplexing unit $314_3$.

With such a configuration, it is possible to easily switch between multiplexing units with different characteristics, and thus even an RGB coupler having a small allowable error in manufacturing is capable of individual accurate monitoring even in a case of being in actual operation without reducing the yield. Compared to the first example, the circuit size of the optical circuit of the RGB coupler is slightly larger, but required locations of alignment between the RGB coupler and external optical elements can be reduced.

Figure 7A:
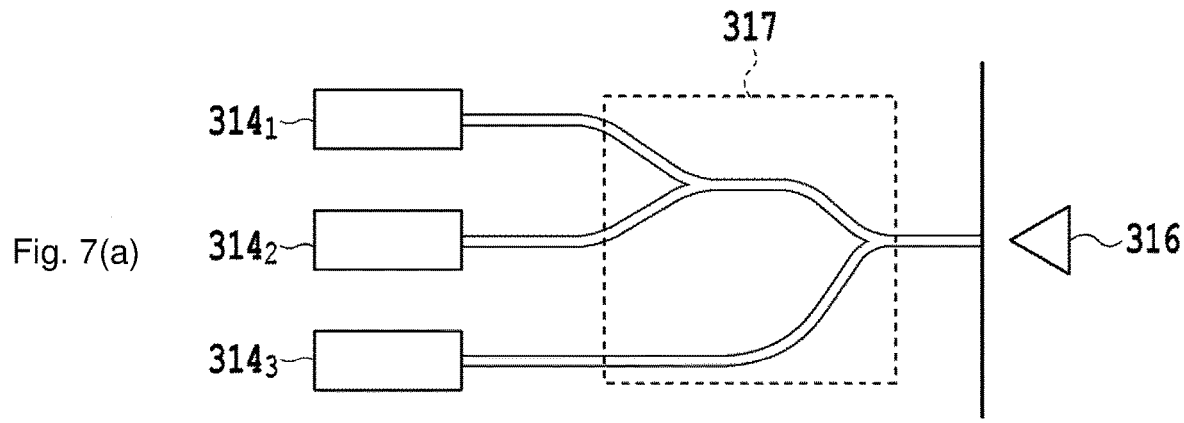
FIGS. 7(*a*)-7(*c*) are diagrams illustrating an example of a multiplexer according to the second example of the second embodiment.
Figure 7B:
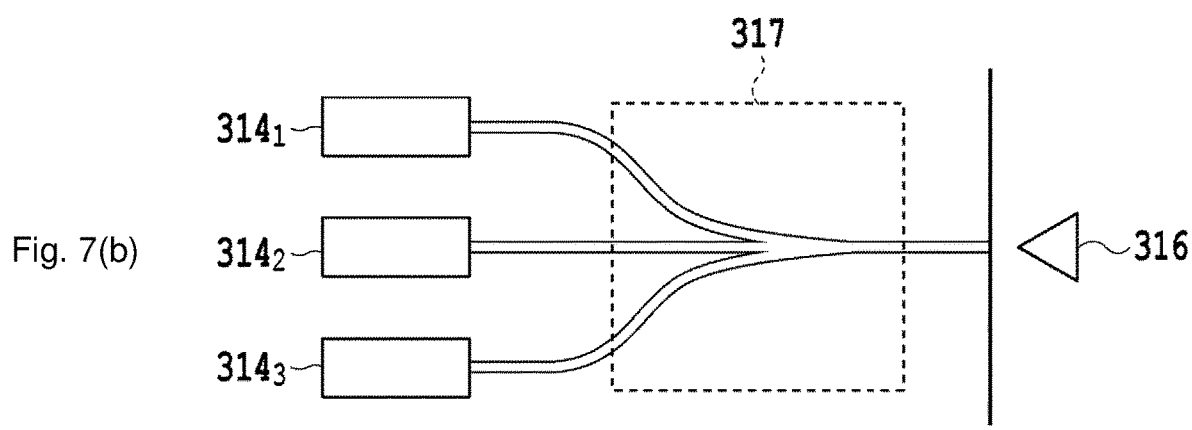
Figure 7C:
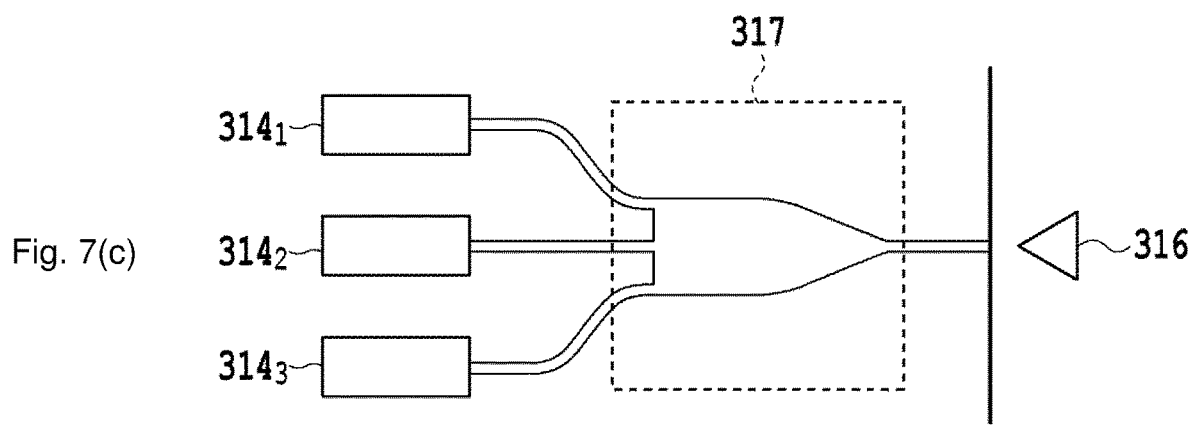

FIG. 7 illustrates an example of a multiplexer according to the second example of the second embodiment. A single mode needs to be maintained in order to output light of each of colors of R, G, and B multiplexed by the multiplexing units $314_1$ to $314_3$ to the output port 316. Thus, an optical circuit in which Y branch circuits illustrated in FIG. 7(a) are connected in two stages, a three-branch circuit illustrated in FIG. 7(b), or an optical circuit combining a Multi-mode Interference (MMI) with a mode converter illustrated in FIG. 7(c) is applied to the multiplexer 317.

Third Example

Figure 8:
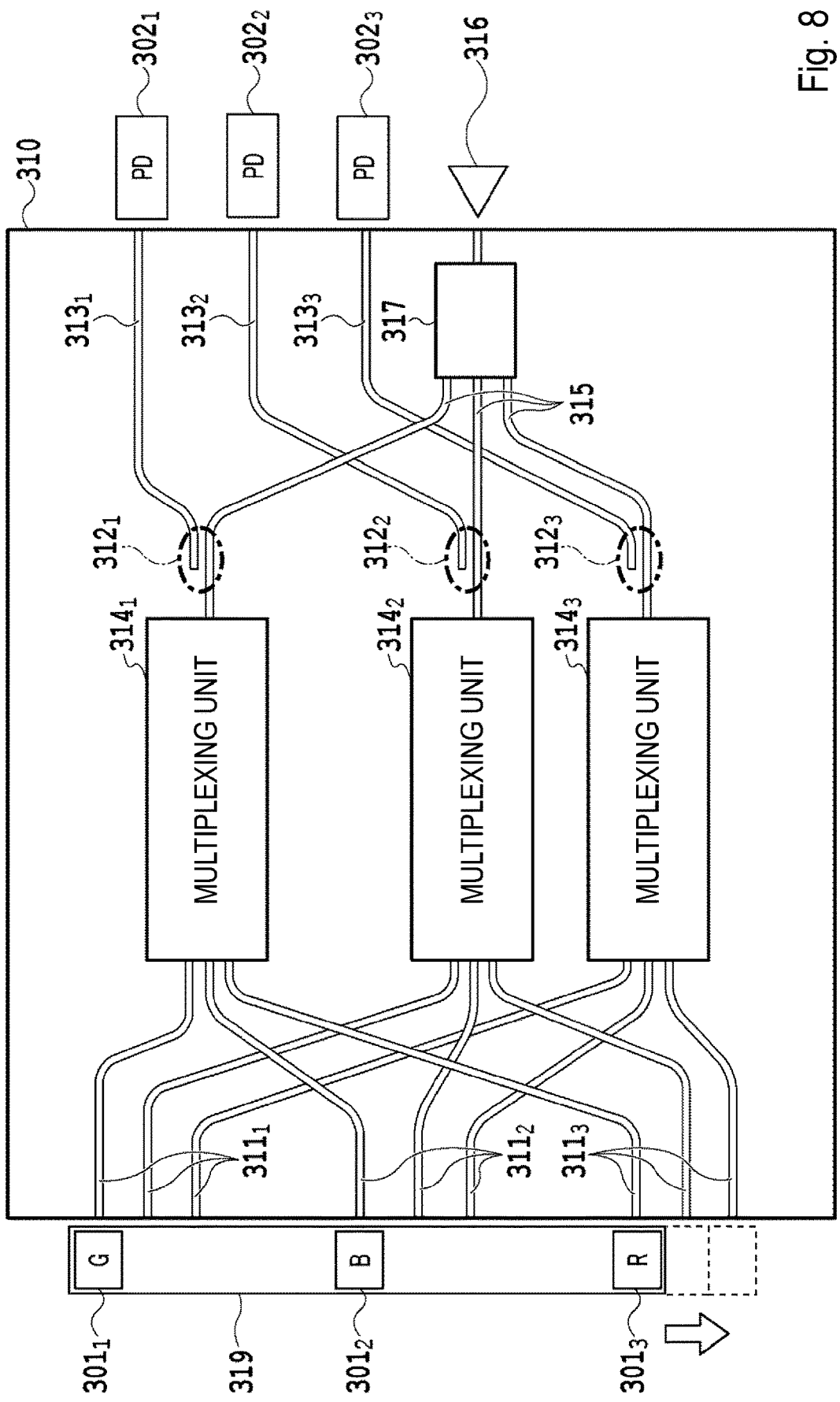
FIG. 8 is a diagram illustrating a light source with a monitoring function according to a third example of the second embodiment of the present invention.

FIG. 8 is a diagram illustrating a light source with a monitoring function according to a third example of the second embodiment of the present invention. The light source of the third example differs in the connecting order of the branching units and the multiplexing units of the RGB coupler 310. The PLC-type RGB coupler 310 includes first to third input waveguides $311_1$ to $311_3$ optically connected to the first to third LDs $301_1$ to $301_3$, multiplexing units $314_1$ to $314_3$ that respectively multiplex light of the respective colors input to the first to third input waveguides $311_1$ to $311_3$, first to third branching units $312_1$ to $312_3$ that divide the outputs of the multiplexing units $314_1$ to $314_3$ into two, a multiplexer 317 that multiplexes beams each being one beam of the light divided by each of the first to third branching units $312_1$ to $312_3$, and first to third monitoring waveguides $313_1$ to $313_3$ that output the other beam of the light divided by each of the first to third branching units $312_1$ to $312_3$ to the first to third PDs $302_1$ to $302_3$.

In the third example, light in which light of the respective colors R, G, and B is multiplexed is output to the first to third monitoring waveguides $313_1$ to $313_3$. Thus, in a case where light of the respective colors of R, G, and B is monitored, it is necessary to use a wavelength filter or the like in a preceding stage of the first to third PDs $302_1$ to $302_3$ to separate. The multiplexer 317 uses the multiplexer of FIG. 7 illustrated in the second example.

Note that, in the RGB coupler, the branching units for monitoring, the multiplexing units, and the multiplexer that multiplexes the outputs of the plurality of multiplexing units have various connection configurations as illustrated in the first to third examples, and the present invention is not limited to these examples.

Fourth Example

Figure 9:
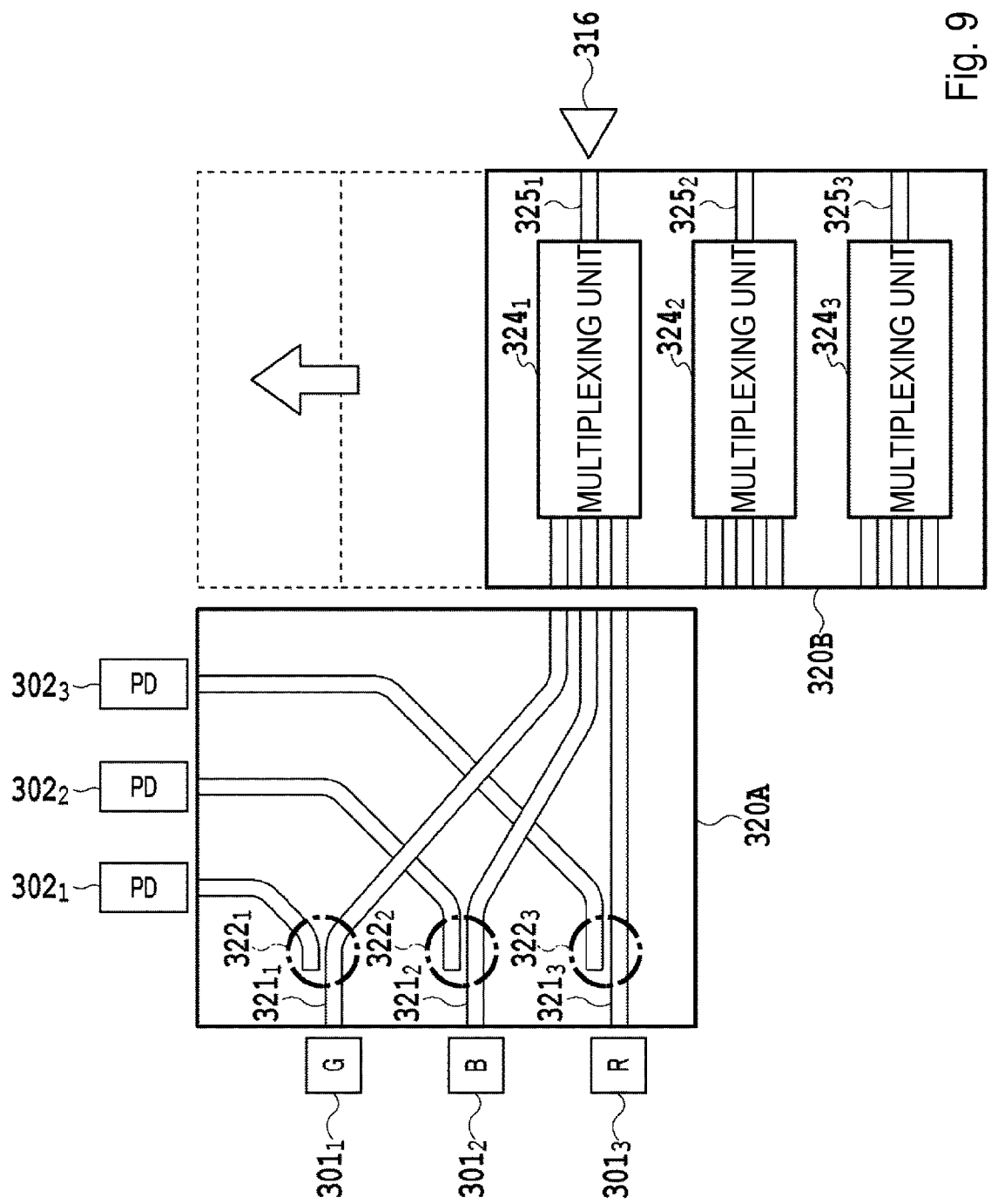
FIG. 9 is a diagram illustrating a light source with a monitoring function according to a fourth example of the second embodiment of the present invention.

FIG. 9 illustrates a light source with a monitoring function according to a fourth example of the second embodiment of the present invention. The configuration of the light source with the monitoring function is the same as that of the first and second examples, except that the RGB coupler 320 is divided into two PLC substrates of an RGB coupler 320A and an RGB coupler 320B.

The RGB coupler 320A includes first to third input waveguides $321_1$ to $321_3$ optically connected to first to third LDs $301_1$ to $301_3$, and first to third branching units $322_1$ to $322_3$ that divide light propagating in the waveguide into two. Then, one beam of the light that is divided by each of the first to third branching units $322_1$ to $322_3$ is output to the RGB coupler 320B. The other beam of the light is output to the first to third PDs $302_1$ to $302_3$ via a plurality of monitoring waveguides $313_1$ to $313_3$.

The RGB coupler 320B includes three sets of multiplexing units $324_1$ to $324_3$ that multiplex beams each being one beam of light that is divided by the first to third branching units $322_1$ to $322_3$. By changing the fixed position of the RGB coupler 320B relative to the RGB coupler 320A, it is possible to switch from the multiplexing unit $324_1$ to the multiplexing unit $324_2$ or the multiplexing unit $324_3$.

With such a configuration, it is possible to easily switch between multiplexing units with different characteristics, and thus even an RGB coupler having a small allowable error in manufacturing is capable of individual accurate monitoring even in a case of being in actual operation without reducing the yield. Compared to the first example, the number and intersection of the waveguides in the RGB coupler 320A and 320B can be reduced, and the circuit size of the optical circuit can be reduced.

In the third example, the emission direction of the light from the LD 301 is configured to be generally perpendicular to the incident direction of the light at the PD 302, and thus it is possible to avoid stray light entering PD 302. Stray light is light that has leaked into the RGB coupler 310 without the output of the LD 301 being able to couple to the input waveguide 311, or the like.

Other Examples

In the second example, three outputs of the first to third monitoring waveguides $313_1$ to $313_3$ are multiplexed by the multiplexers $318_1$ to $318_3$ and output to the first to third PDs $302_1$ to $302_3$. In a case where the effective light-receiving area in the light-receiving surface of each PD is wide, the light emitted from all of the three monitoring waveguides can also be received by the PDs by disposing the three monitoring waveguides at 5 to 20 µm intervals at the end surface of the RGB coupler 310. In other words, the multiplexers $318_1$ to $318_3$ can be omitted. Similarly, for optical coupling from the output waveguide 315 to the output port 316, in a case where the three output waveguides 315 are disposed at 5 to 20 µm intervals, a spatial optical system of the output port 316 may be fine tuned, and the multiplexer 317 can be omitted.

In the first example as well, in a case where the first to third monitoring waveguides $313_1$ to $313_3$ and the three output waveguides 315 can be arranged as described above, the multiplexing units $314_1$ to $314_3$ can be switched by changing only the relative positional relationship between the RGB coupler and the LDs.

In the third example, the emission direction of the light from the LD 301 is configured to be generally perpendicular to the incident direction of the light at the PD 302. In the first and second example as well, in a case where the output ends of the first to third monitoring waveguides $313_1$ to $313_3$ are disposed on the end surface of the side orthogonal to the side coupled to the LD 301, it is possible to avoid stray light from entering the PD 202 or 302. At this time, it is also possible to remove light that is not multiplexed by the multiplexing unit 314 or stray light that has leaked out therefrom or stray light that has leaked out to the interior of the RGB coupler 310 via a disposal port of the multiplexing unit 314.

REFERENCE SIGNS LIST 1 to 3, 21 to 23, 201, 301 LD
4 to 6 Lens
7 to 9 Half mirror
10 to 12 Dichroic mirror
13 to 15, 202, 302 Photodiode (PD)
16 MEMS
17 Screen
30, 100, 210, 310, 320A, 320B RGB coupler
31 to 33 Waveguide
34, 35 Multiplexer
101 to 103, 211, 311, 321 Input waveguide
104, 105 Directional coupler
106, 215, 315, 325 Output waveguide
212, 312, 322 Branching unit
213, 313 Monitoring waveguide
214, 314, 324 Multiplexing unit
316 Output port

The invention claimed is:

1. A light source with a monitoring function, the light source comprising:
an optical multiplexing circuit comprising:
a plurality of branching units each configured to divide light output from a corresponding one of a plurality of input waveguides;
a multiplexing unit configured to multiplex beams each being one beam of the light divided by each of the plurality of branching units;
an output waveguide configured to output the light multiplexed by the multiplexing unit; and
a plurality of monitoring waveguides each configured to output another beam of the light divided by each of the plurality of branching units;
a plurality of laser diodes each optically coupled to a corresponding one of the plurality of input waveguides; and
a plurality of photodiodes each optically coupled to a corresponding one of the plurality of monitoring waveguides,
wherein a plurality of optical multiplexing circuits including multiplexing units having different multiplexing characteristics are provided on a same substrate, and
wherein the multiplexing units of the plurality of optical multiplexing circuits are switched by changing a fixed position of the plurality of optical multiplexing circuits relative to the plurality of laser diodes and the plurality of photodiodes.

2. The light source with a monitoring function according to claim 1, further comprising:
a multiplexer configured to multiplex outputs from the multiplexing units of the plurality of optical multiplexing circuits, and a multiplexer configured to multiplex outputs from monitoring waveguides of the plurality of optical multiplexing circuits.

3. The light source with a monitoring function according to claim 1, wherein outputs from the multiplexing units of the plurality of optical multiplexing circuits and outputs from the monitoring waveguides of the plurality of optical multiplexing circuits are arranged at 5 to 20 μm intervals at an end surface of the substrate.

4. The light source with a monitoring function according to claim 1, wherein a light emission direction from the plurality of laser diodes is configured to be generally perpendicular to an incident direction of light at the plurality of photodiodes.

5. The light source with a monitoring function according to claim 1, wherein the plurality of laser diodes are three laser diodes configured to output light of three primary colors of red light, green light, and blue light.

6. The light source with a monitoring function according to claim 2, wherein a light emission direction from the plurality of laser diodes is configured to be generally perpendicular to an incident direction of light at the plurality of photodiodes.

7. The light source with a monitoring function according to claim 3, wherein a light emission direction from the plurality of laser diodes is configured to be generally perpendicular to an incident direction of light at the plurality of photodiodes.

8. The light source with a monitoring function according to claim 4, wherein the plurality of laser diodes are three laser diodes configured to output light of three primary colors of red light (R), green light (G), and blue light (B).

9. A light source with a monitoring function, the light source comprising:
a first substrate including a plurality of branching units each configured to divide light output from a corresponding one of a plurality of input waveguides, and a plurality of monitoring waveguides each configured to output one beam of the light divided by the plurality of branching units;
a second substrate including a plurality of multiplexing units each configured to multiplex beams each being another beam of the light divided by the plurality of branching units, the plurality of multiplexing units each having different multiplexing characteristics, and an output waveguide configured to output light multiplexed by the plurality of multiplexing units;
a plurality of laser diodes each optically coupled to a corresponding one of the plurality of input waveguides; and
a plurality of photodiodes each optically coupled to a corresponding one of the plurality of monitoring waveguides,
wherein the multiplexing units are switched by changing a fixed position of the first substrate relative to the second substrate.

10. The light source with a monitoring function according to claim 9, wherein a light emission direction from the plurality of laser diodes is configured to be generally perpendicular to an incident direction of light at the plurality of photodiodes.

* * * * *